United States Patent [19]
Mueller et al.

[11] 3,802,526
[45] Apr. 9, 1974

[54] ARTICULATED VEHICLE AND JOINT THEREFOR

[76] Inventors: Wayne E. Mueller; Jerry M. Brewer, both of 4634 15 Mile Rd., Apt. 210, Sterling Heights, Mich. 48077

[22] Filed: Jan. 20, 1972

[21] Appl. No.: 219,417

[52] U.S. Cl. ......... 180/14 R, 180/70 R, 180/79.2 B
[51] Int. Cl. .............................................. B60d 1/00
[58] Field of Search ...... 180/14 R, 14 A, 14 B, 140, 180/14 E, 22, 54 R, 70 R, 79.2 B

[56] References Cited
UNITED STATES PATENTS

| | | | |
|---|---|---|---|
| 3,473,619 | 10/1969 | Dion | 180/14 R X |
| 3,353,618 | 11/1967 | Fisher | 180/14 R |
| 2,267,562 | 12/1941 | Higgins | 180/22 |
| 3,442,345 | 5/1969 | Berger | 180/14 R X |
| 2,808,738 | 10/1957 | Bantell | 74/695 X |
| 3,046,813 | 7/1962 | Bixby | 192/4 A X |

Primary Examiner—Evon C. Blunk
Assistant Examiner—Bruce H. Stoner, Jr.
Attorney, Agent, or Firm—Harness, Dickey & Pierce

[57] ABSTRACT

An articulated vehicle embodying two interconnected units each of which has two pairs of driven wheels. The prime mover is carried by one of the units and a drive train of an improved and simplified form transfers the power from the prime mover to the individual driven wheels. The drive train incorporates an articulated joint that extends between the two units and which permits the units to undergo three planes of movement relative to each other (yaw, roll and pitch). The vehicle is steered by manipulating the articulated joint and changing the angular relationship between the two units. A simplified braking arrangement is employed in which a brake disk is driven by an output shaft of a transfer gear unit of the drive train for braking all of the wheels via a single brake unit.

6 Claims, 8 Drawing Figures

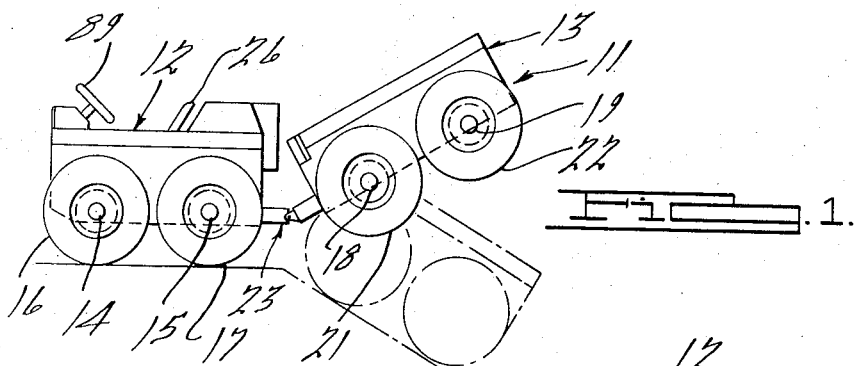
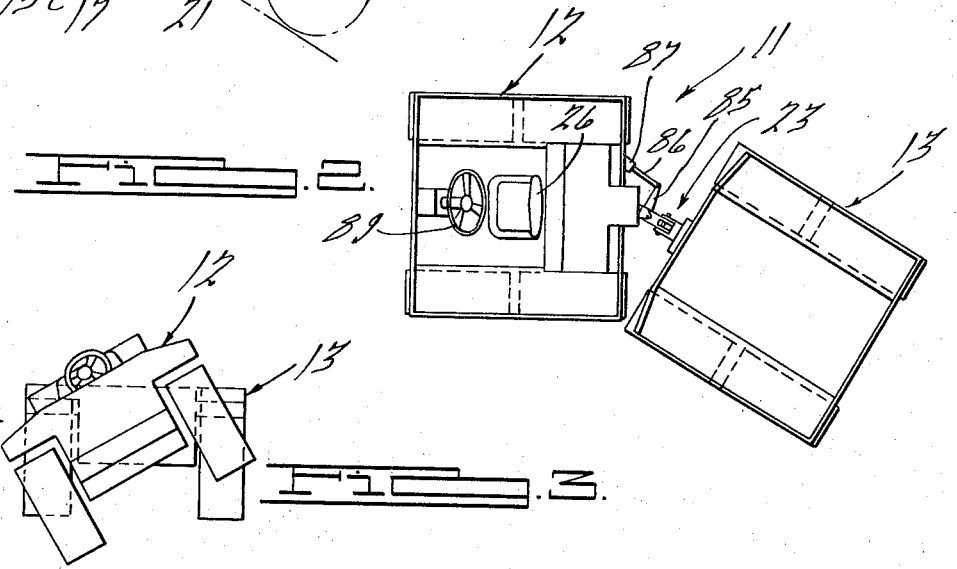
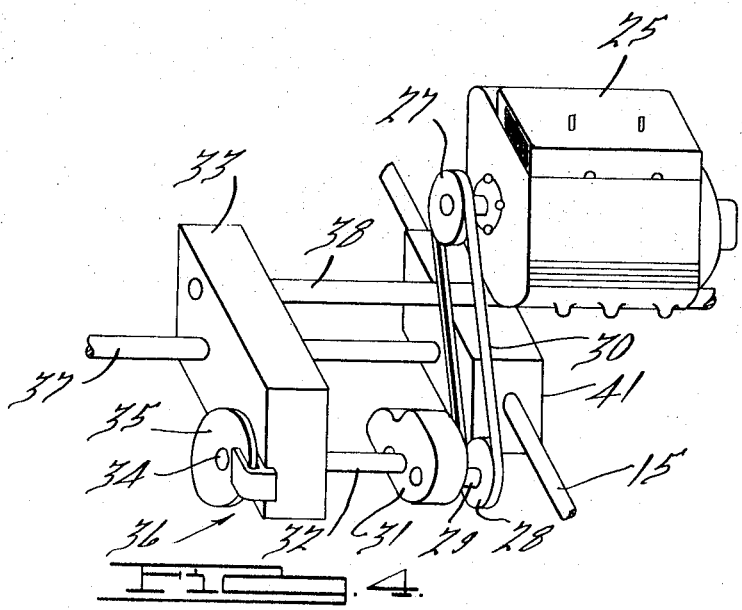

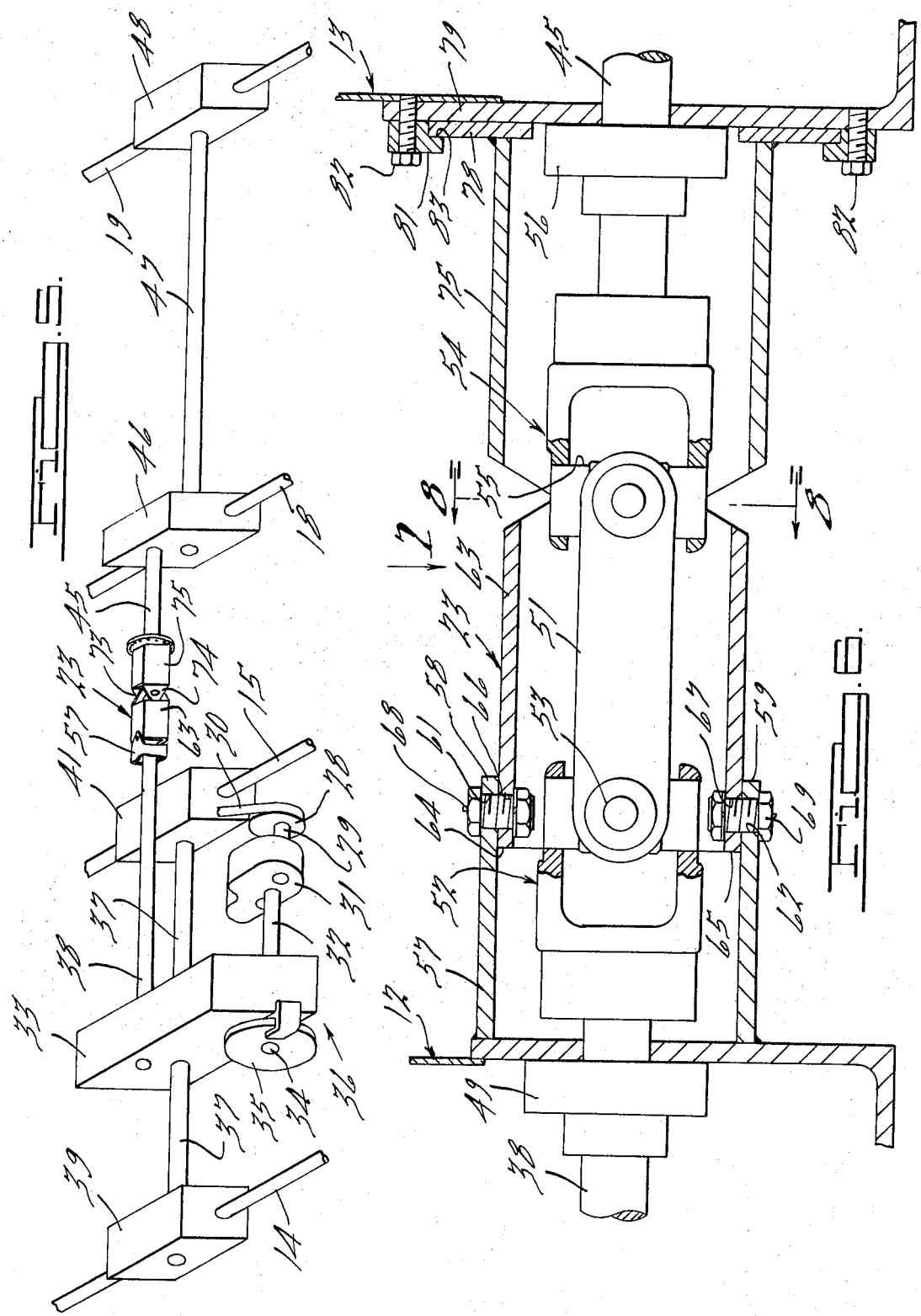

ARTICULATED VEHICLE AND JOINT THEREFOR

BACKGROUND OF THE INVENTION

This invention relates to a self-propelled vehicle and particularly to an improved self-propelled vehicle of the articulated type and an improved joint for such a vehicle.

In many types of vehicles, particularly off the road vehicles, more than one pair of axles is driven. It is not uncommon for such off the road vehicles to have three or more sets of driven axles. Providing an effective compact and low cost drive arrangement for such a vehicle presents considerable problems. Chains are frequently used for this purpose. Chain drives, however, occupy considerable space presenting some safety hazard and require periodic adjustment and/or replacement. Similar disadvantages are presented by belts. Although gear trains can be used for this purpose, those previously proposed have been very complicated and, accordingly, expensive.

It is, therefore, a principal object of this invention to provide an improved and simplified multi-axle drive for a self-propelled vehicle.

In addition to the problem of driving all of the axles of a vehicle of the type described previously, the provision of adequate and effective braking systems for such vehicles also is a problem. Ideally all of the vehicle wheels should experience the braking forces. If, however, individual brake units are provided for each set of wheels considerable expense is encountered.

It is, therefore, another object of this invention to provide an improved braking system for a multi-axle vehicle.

It is a further object of this invention to provide a drive arrangement for a multi-axle vehicle that embodies a single brake that acts upon all of the wheels of the vehicle.

One particularly advantageous form of off the road vehicle is the articulated type vehicle. Such a vehicle is comprised of a plurality of interconnected units each of which has driven axles. In order to provide maximum versatility of such a vehicle for use on all terrains the drive train that extends between the individual units should permit the units to move in all planes relative to each other while still maintaining a driving relationship. Furthermore, it has been found desirable to steer the vehicle by changing the orientation of the units relative to each other relative to a vertically extending axis, i.e., yaw steering. The articulated joint that permits this movement should be capable of all of these motions and yet should be relatively low in cost. Also, the articulated joint should be capable of transmitting tractive forces between the respective units, where necessary.

It is, therefore, a further object of this invention to provide an improved articulated joint for an articulated vehicle.

It is another object of the invention to provide an articulated joint that is low in cost but which effectively permits all degrees of freedom in the relative movement between two units.

SUMMARY OF THE INVENTION

A first feature of this invention is adapted to be embodied in a vehicular drive arrangement for transmitting drive from a power plant to a plurality of axles. The drive arrangement includes a change speed transmission adapted to be driven by the power plant. A first transfer gear unit has an input shaft that is driven from the output of the change speed transmission and at least two driven output shafts. First and second pairs of axles are provided. Means drive each of the first pair of axles from one of the driven output shafts of the first transfer gear unit. A second transfer gear unit has an input shaft that is driven by the second output shaft of the first transfer gear unit and a pair of driven output shafts. Means transmit the drive from each of the output shafts of the second transfer gear unit to respective of the second pair of axles.

Another feature of the invention is adapted to be embodied in a drive arrangement for a vehicle having a plurality of driven axles. Such a vehicle includes a change speed transmission and drive means for transferring drive from the change speed transmission to each of the driven axles. A counter shaft is driven from the change speed transmission and selectively operable brake means are operable upon the counter shaft and through the drive means upon the driven axles for braking the rotation of the driven axles.

Another feature of this invention is adapted to be embodied in an articulated joint for transmitting drive between separate units of an articulated vehicle and for permitting freedom of movement in a plurality of planes between the units. The joint comprises a drive shaft that is adapted to be journalled in one of the vehicle units and a driven shaft that is adapted to be journalled in the other of the units. An intermediate shaft is drivingly connected at its opposite ends to the driving and driven shafts by first and second universal joints, respectively. First and second housings encircle, respectively, portions of the driving and driven shafts. A third housing encircles at least a portion of the intermediate shaft. Means form a pivotal connection between the one end of the first housing and one end of the third housing. The pivot axis of this pivotal connection is coincident with a pivot axis of the first universal joint. Means form a pivotal connection between the other end of the third housing and one end of the second housing. The pivot axis of this pivotal connection is coincident with a pivot axis of a second universal joint and is disposed in angular relationship to the pivot axis between the first housing and third housing.

BRIEF DESCRIPTION OF THE DRAWINGS

FIG. 1 is a side elevational view of an articulated vehicle embodying this invention and showing the freedom of movement between the two units of the vehicle in pitch.

FIG. 2 is a top plan view of the vehicle showing the freedom of movement in yaw.

FIG. 3 is an end elevation view of the vehicle showing the freedom of movement in roll.

FIG. 4 is an enlarged, schematic perspective viewing showing a portion of the drive train of the vehicle.

FIG. 5 is an enlarged perspective view of the remaining portion of the drive train of the vehicle.

FIG. 6 is a further enlarged view showing the articulated joint between the vehicle units and is taken along a vertically oriented plane.

DETAILED DESCRIPTION OF THE PREFERRED EMBODIMENT

Figure 7:
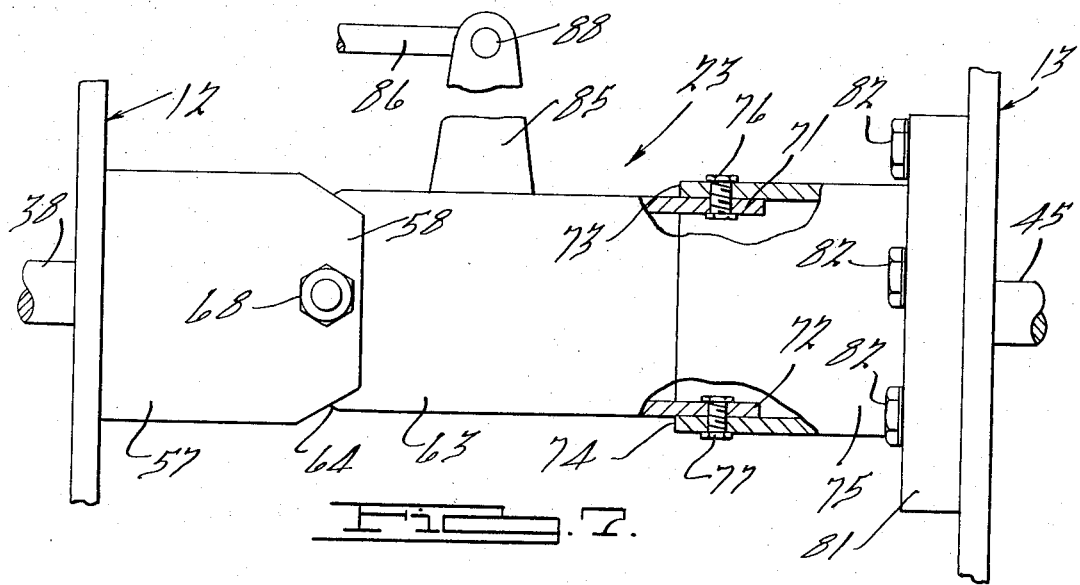
FIG. 7 is a top plan view of the universal joint taken in the direction of the arrow 7 in FIG. 6.

Referring first to FIGS. 1 through 3, an articulated vehicle embodying this invention is identified generally by the reference numeral 11. Although the invention is disclosed in connection with an articulated vehicle, wherein the various features have particular utility, certain of these features may be used with other types of vehicles.

The articulated vehicle 11 is comprised of a first or lead unit 12 and a second or trailing unit 13. The lead unit 12 has a pair of driving axles 14 and 15 on which pairs of wheels 16 and 17, respectively, are mounted. In a like manner, the trailing unit 13 has pairs of driven axles 18 and 19 on which pairs of driven wheels 21 and 22 are mounted. As will become apparent, the prime mover for driving the vehicle 11 is located in the lead unit 12. A transmission is provided for driving the axles 14 and 15 of the lead units 12 and for driving the axles 18 and 19 of the trailing unit 13. This transmission unit includes an articulated joint, indicated generally by the reference numeral 23, that transmits the drive from the lead unit 12 to the trailing unit 13.

The articulated joint 23 is constructed in such a manner that the units 12 and 13 may pivot relative to each other about a horizontally disposed axis (FIG. 1) to accommodate pitch between the units 12 and 13. In addition, the units 12 and 13 may pivot relative to each other about a vertically extending axis (FIG. 2) so as to accommodate yaw between these units. Furthermore, the articulated joint 23 and the connection between the vehicle units 12 and 13 is such as to permit roll of the units relative to each other (FIG. 3). Thus, the units 12 and 13 may move relative to each other in any of three senses. This enables the vehicle 11 to travel over extremely rough terrain and furthermore permits steering, as has been noted, by manipulation of the angular relationship between the units 12 and 13 about a vertically oriented axis.

The drive train of the vehicle is shown schematically in FIGS. 4 and 5. The drive train uses a number of interchangeable components and is extremely simple in construction. Thus, an effective drive of all of the axles 14, 15, 18 and 19 is provided at a low cost.

The drive train consists of a prime mover in the form of an internal combustion engine 25 which may be of any known type and which is supported in the vehicle unit 12 at an appropriate location, preferably behind and below the driver's seat 26 (FIGS. 1 through 3). The engine 25 has a drive shaft on which a pulley 27 is mounted. The pulley 27 drives a pulley 28 fixed on the input shaft 29 of a change speed transmission 31 by means of a flexible belt 30. The change speed transmission 31 may incorporate a clutch, fluid clutch or torque converter as desired. An output shaft 32 of the change speed transmission 31 directly drives an input shaft of a first transfer gear case 33.

The transfer gear case 33 has a lay shaft 34 to which the brake disk or rotor 35 of a disk brake assembly, indicated generally by the reference numeral 36 is affixed. The disk brake assembly 36 is adapted to be selectively actuated in any known manner. Since the lay shaft 34 of the first transfer gear unit 33 is driven along with each of the axles 14, 15, 18 and 19, which are driven in a manner to be described, the brake assembly 36 will act through this drive train on each of the vehicle wheels. A plurality of separate brakes and the attendant cost thereof is, therefore avoided. The disk brake assembly 36 will, of course, be designed to have sufficient capacity to effectively brake all of the wheels 16, 17, 21 and 22.

The first transfer gear unit 33 has a first output shaft 37 that extends through opposite sides of the transfer gear case. In addition, a second output shaft 38 extends from the transfer gear unit 33 toward the rear of the vehicle. The output shaft 38 is disposed at a higher lever in the vehicle than the output shaft 37, for a reason which will become apparent.

The forward end of the first output shaft 37 enters a final drive unit 39 that transmits final drive to the axle 14. The rearward end of the first output shaft 37 transmits its drive to a final drive unit 41 which, in turn, drives the axle 15.

The second output shaft 38 of the first transfer gear box 33 extends across the final drive unit 41 and has its end connected to an input shaft 45 of a combined transfer gear unit and final drive 46. The drive is transmitted from the shaft 38 to the shaft 45 through the articulated joint 23. The transfer gear and final drive unit 46 is carried by the second vehicle unit 13 and provides a final drive to the axle 18. In addition, the unit 46 has a second output shaft 47 that is disposed in the same horizontal plane as the first output shaft 37 of the first transfer drive unit 33. The shaft 47 extends to a final drive unit 48 which, in turn, drives the axle 19.

Final drive units 39, 41 and 48 are identical in construction thus reducing the number of different components used in the vehicle. This provides a cost having which, coupled with the other features permits the vehicle to be constructed at a considerably lower cost than previously proposed vehicles of this type.

The construction of the articulated joint 23 will now be described in detail by particular reference to FIGS. 6 through 8. The rearward end of the output shaft 38 is journalled at the rear of the vehicle unit 12 by means including a bearing 49. At the outboard end of the bearing 49 the shaft 38 is connected in driving relationship to one end of an intermediate shaft 51 by means of a universal joint, indicated generally by the reference numeral 52 and including a cruciform member 53. The opposite end of the intermediate shaft 51 is connected to the input end of the shaft 45 by means of a second universal joint assembly 54 that incorporates a cruciform member 55. A bearing 56 supports the shaft 45 at the forward end of the vehicle unit 13.

A first, generally rectangularly shaped housing 57 encircles the outboard end of the shaft 38 and at least part of the universal joint 52. One end of the housing 57 is affixed to the trailing end of the vehicle unit 12 in any suitable, rigid manner. The other end of the housing 57 is formed with a pair of ears or extensions 58 and 59 having respective openings 61 and 62 that are aligned with an axis of the universal joint 52. An intermediate housing 63 encircles the intermediate shaft 51 and has forwardly extending projections 64 and 65 that have openings 66 and 67, respectively. The openings 66 and 67 are aligned with each other and are aligned with the openings 61 and 62 and, accordingly, with an axis of the universal joint 52. Pivot members 68 and 69 extend through the openings 61, 66 and 62, 67, respectively to pivotally connect the intermediate housing 63 with the first housing 57. The point of pivotal connection is coincident with one of the pivot axes of the universal joint 52.

The trailing edge of the intermediate housing 63 has rearwardly extending projections 71 and 72 that are formed with openings which are aligned with forwardly extending projections 73 and 74 of a third generally rectangularly shaped housing 75. Pivot members 76 and 77 pivotally connect the trailing end of the housing 63 with the leading end of the housing 75 about a pivot axis that is coincident with one of the pivot axes of the universal joint 54.

The housing 75 has affixed to it a universal member or flange 78 that is juxtaposed to a plate 79 that forms a portion of the forward end of the vehicle unit 13. A recessed bearing member 81 having a annular configuration is affixed to the plate 79 by means of bolts 82. The bearing member 81 defines a cavity 83 in which the flange 78 is journalled for rotation about an axis that is aligned with the axis of the shaft 45.

It should be readily apparent that the described construction of the articulated joint 23 permits the desired relative movement between the vehicle units 12 and 13 in three planes. Pitch or pivotal movement about a horizontal axis is accommodated by pivotal movement of the housing 63 relative to the housing 75 about the pivot member 76 and 77. Simultaneously, the drive through the shafts 51 and 45 will be transmitted through this angle by pivotal movement of the universal joint 54 about a like axis. In a like manner, yaw or pivotal movement about a vertical axis is permitted by the pivotal movement between the housing member 57 and 63. The universal joint 52 accommodates this pivotal movement. Roll is permitted by rotation of the housing members 57, 63 and 75 relative to the vehicle unit 13. This motion is permitted by the bearing 81 and its engagement with the flange 78.

Figure 8:
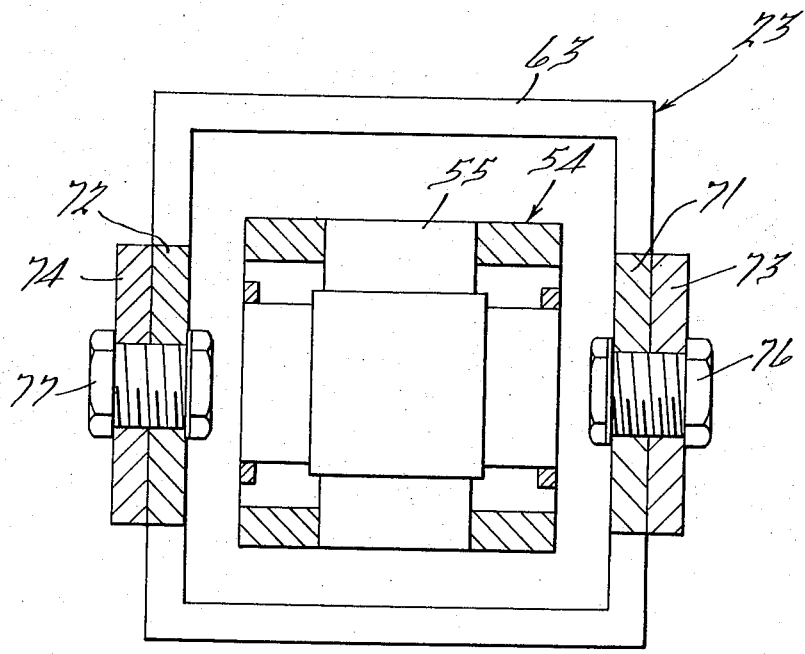
FIG. 8 is a cross sectional view taken along the line 8—8 of FIG. 6.

In order to steer the vehicle unit 11, the articulated joint 23 is manipulated by a steering mechanism best shown in FIGS. 2 and 7. The steering mechanism includes an outwardly extending lever 85 that is affixed to the intermediate housing 63. A piston rod 86 of a hydraulic cylinder 87 is affixed by means of a pivotal connection 88 to the outer end of the piston rod 86. The opposite end of the cylinder 87 is pivotally supported in any suitable manner on the vehicle unit 12.

A suitable pump mechanism is provided for pressurizing hydraulic fluid and a valve controlled by a steering wheel 89 and will deliver fluid to one side or the other of the cylinder 87 to move the piston rod 86 and lever 85 in an appropriate direction. This movement causes the articulated joint to pivot about the axis provided for by the pivot members 68 and 69. Since all four sets of wheels 16, 17, 21 and 22 are driven the vehicle will traverse a circular path when the units 12 and 13 are pivoted relative to each other.

It is to be understood that the foregoing description is that of a preferred embodiment of the invention. In the illustrated embodiment, the change speed transmission 31 and transfer gear unit 33 are separate assemblies. It is to be understood that these units may be incorporated in a single gear case, if desired. In addition, the term "change speed transmission" as used herein is intended to encompass various devices for altering the transmission ratio between the input and output shafts such as automatic transmissions or the like. Various other changes and modifications may be made without departing from the spirit and scope of the invention as defined by the appended claims.

We claim:

1. A vehicle comprising a first vehicle unit, a second vehicle unit, and a vehicular drive arrangement for transmitting drive from a power plant in one of said units to a plurality of axles of said units, said vehicular drive arrangement comprising a change speed transmission adapted to be driven by the power plant and having an output, a first transfer gear unit having an input shaft and at least two driven output shafts, means for driving the input shaft of said first transfer gear unit from the output of said change speed transmission, said first unit having a first pair of axles, said second unit having a second pair of axles, means for driving each of said first pair of axles from one of said driven output shafts of said first transfer gear unit, a second transfer gear unit having an input shaft and a pair of driven outputs, means including an articulated joint for driving said input shaft of said second transfer gear unit from the other output shaft of said first transfer gear unit and for permitting relative movement between said vehicle units with three degrees of freedom, said articulated joint including first and second universal joints, said universal joints being disposed at opposite ends of an intermediate shaft and connecting said intermediate shaft to said other output shaft of said first transfer gear unit and said input shaft of said second transfer gear unit, a first housing affixed to said first unit and encircling a portion of said other output shaft of said first transfer gear unit, an intermediate housing pivotally connecting at one of its ends to one end of said first housing for pivotal movement about an axis aligned with the first of the universal joints, a third housing carried by said second unit, means providing a pivotal connection between the other end of said intermediate housing and one end of said third housing, the pivotal axis of said pivotal connection between said third housing and the other end of said intermediate housing being coincident with a pivot axis of the second universal joint, and means for transmitting a drive from each of said outputs of said second transfer gear unit to respective axles of said second pair of axles.

2. A vehicle and vehicular drive arrangement as set forth in claim 1 in which the power plant change speed transmission and first transfer gear unit are carried by the first unit and the second transfer gear unit is carried by the second unit.

3. A vehicle and vehicular drive arrangement as set forth in claim 2 further including means for changing the angular relationship between the units by pivoting them about a vertically extending axis to steer the vehicle.

4. A vehicle and vehicular drive arrangement as set forth in claim 1 further including an idler shaft driven by the first transfer gear unit and brake means operative upon said idler shaft for braking all of the vehicle axles through the vehicle drive arrangement.

5. A vehicle and vehicular drive arrangement as set forth in claim 1 wherein all of the axles of the vehicle and the first output shaft of the first transfer gear unit lie in a common plane, the second output shaft of the first transfer gear unit being disposed above said common plane.

6. A vehicle and vehicular drive arrangement as set forth in claim 1 wherein the third housing is rotatably carried by the second unit for permitting roll of the second unit relative to the first unit.

* * * * *